E. E. WICKERSHAM.
POSITIVE REDUCTION STEERING TRANSMISSION.
APPLICATION FILED MAY 7, 1919.

1,344,368.

Patented June 22, 1920.
4 SHEETS—SHEET 1.

INVENTOR
*Elmer E. Wickersham*
BY
*Strong & Townsend*
ATTORNEYS

E. E. WICKERSHAM.
POSITIVE REDUCTION STEERING TRANSMISSION.
APPLICATION FILED MAY 7, 1919.
1,344,368.
Patented June 22, 1920.
4 SHEETS—SHEET 2.
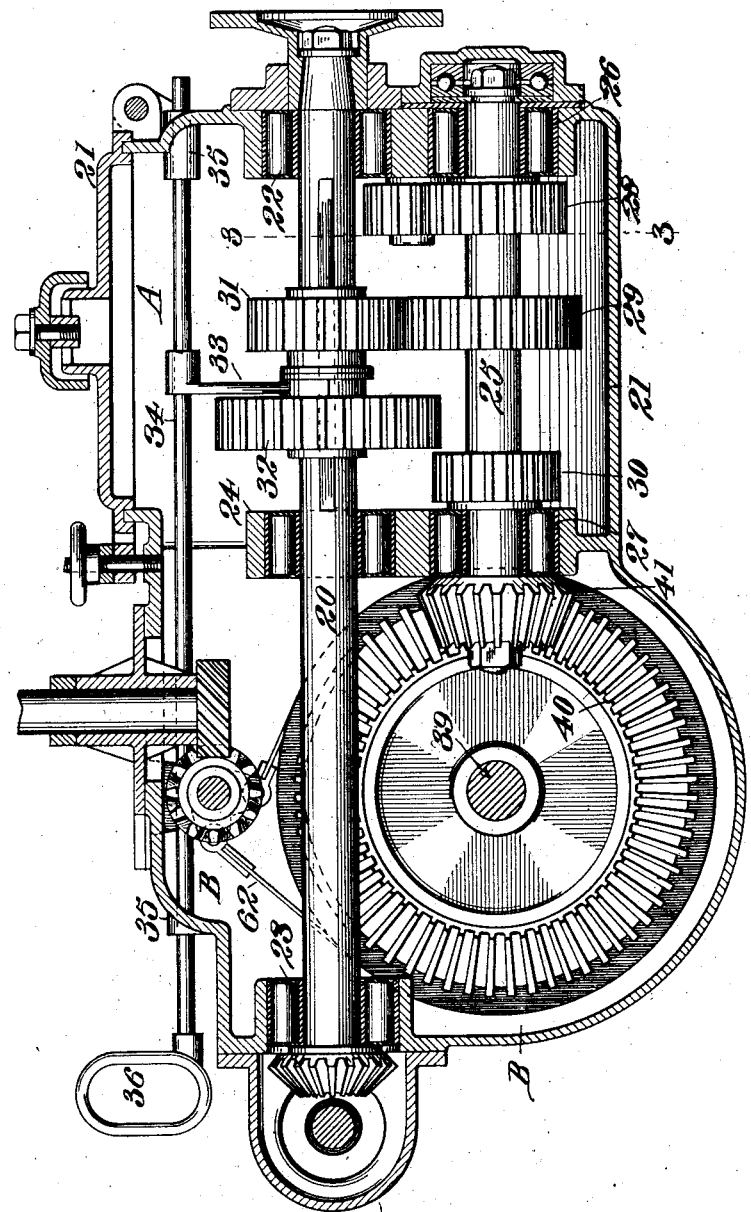
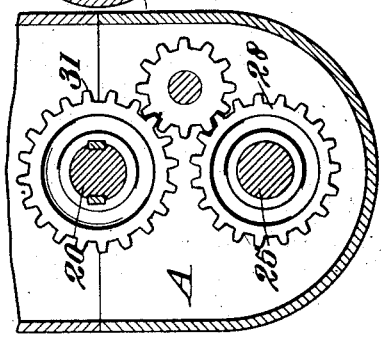
INVENTOR
Elmer E. Wickersham
BY
Strong & Townsend
ATTORNEYS

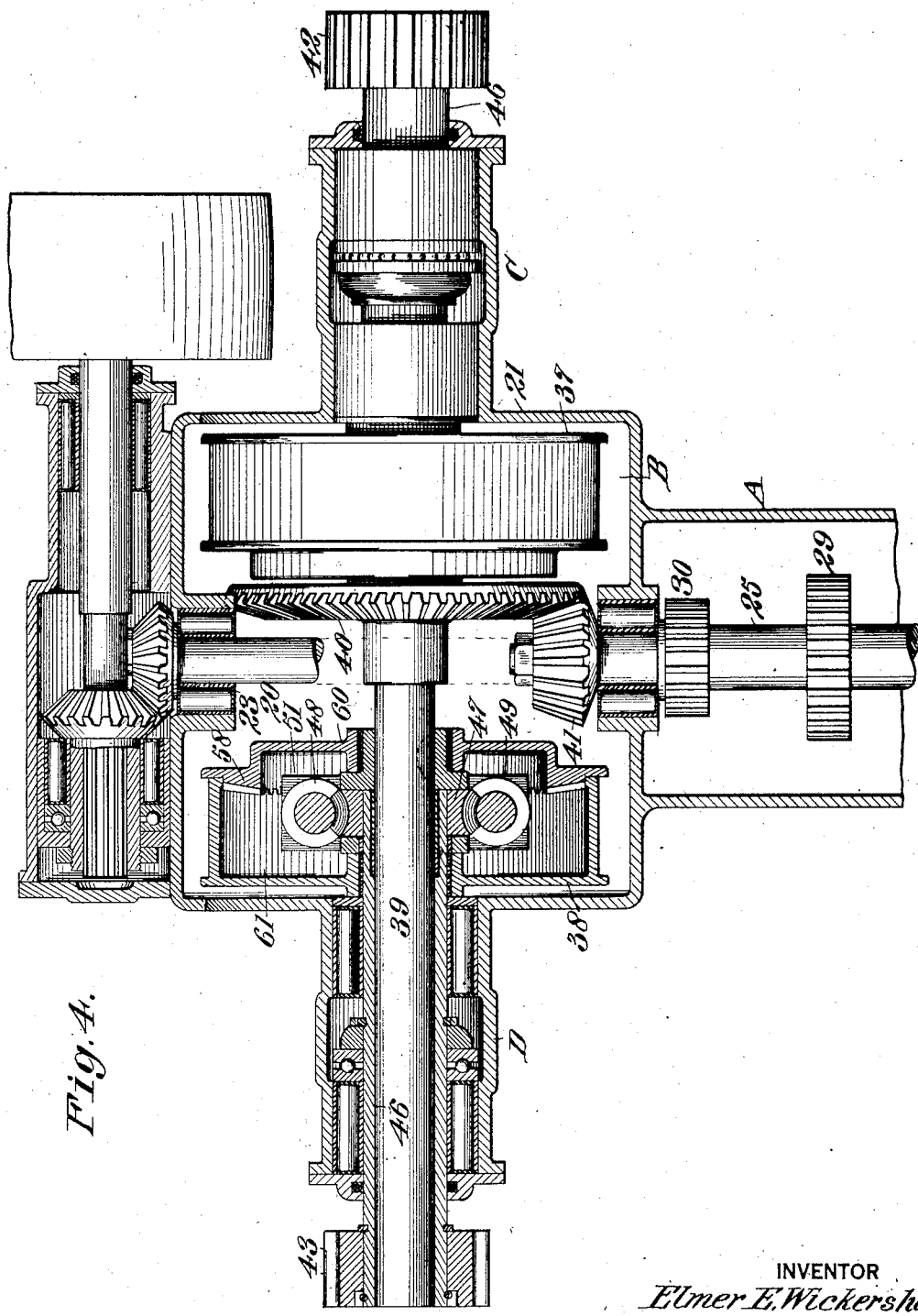

E. E. WICKERSHAM.
POSITIVE REDUCTION STEERING TRANSMISSION.
APPLICATION FILED MAY 7, 1919.
1,344,368.
Patented June 22, 1920.
4 SHEETS—SHEET 4.
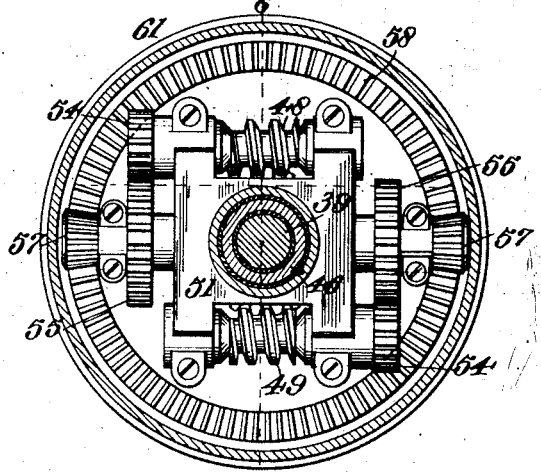
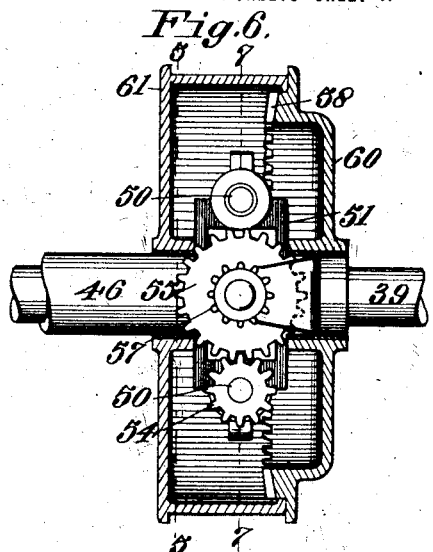
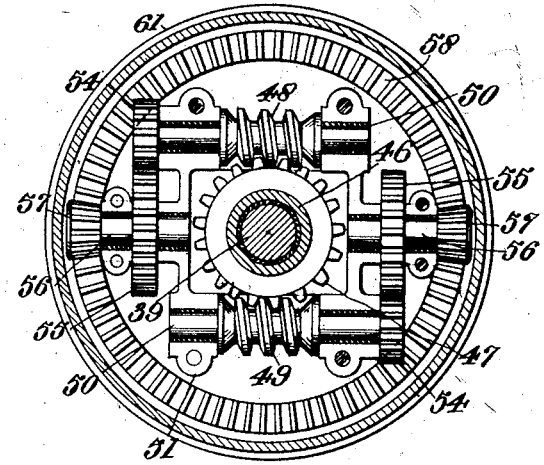
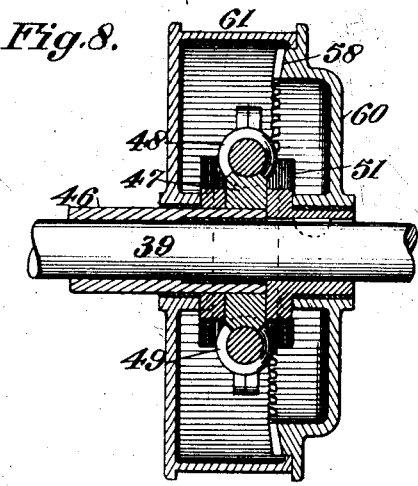
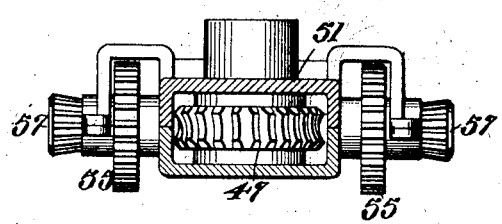
INVENTOR
Elmer E. Wickersham
BY
Strong & Townsend
ATTORNEYS

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

POSITIVE-REDUCTION STEERING TRANSMISSION.

1,344,368.                    Specification of Letters Patent.    Patented June 22, 1920.

Application filed May 7, 1919. Serial No. 295,398.

*To all whom it may concern:*

Be it known that I, ELMER E. WICKERSHAM, a citizen of the United States, residing at Stockton, in the county of San Joaquin and State of California, have invented new and useful Improvements in Positive-Reduction Steering Transmissions, of which the following is a specification.

This invention relates to a steering transmission and particularly pertains to a positive reduction transmission mechanism, especially adapted for use with chain track tractors and other vehicles of like character.

It is the principal object of the present invention to provide a unitary transmission structure for tractors, embodying a set of speed changing gears, a driving shaft for the separate track units of the tractor, and positive means driven through the medium of the speed changing gears and by which positive variation in the operating speeds of the track units of the vehicle may be produced while being constantly driven, the control of the reducing means being made without dissipation of the driving power of the vehicle.

The invention is illustrated by way of example in the accompanying drawings, in which—

Fig. 2 is a view in central vertical section through the transmission mechanism, showing the reduction gears and the driving gears thereof.

Fig. 3 is a fragmentary view in section, as seen on the line 3—3 of Fig. 2, illustrating the arrangement of the reversing gears of the transmission.

Fig. 4 is a view in horizontal section and elevation through the transmission.

Fig. 5 is a view through the transmission in vertical section, as seen on the line 5—5 of Fig. 6, and illustrating one of the positive reduction clutches.

Fig. 6 is a view in section and elevation through one of the positive reduction clutches, as seen on the line 6—6 of Fig. 5.

Fig. 7 is a view of one of the clutches, as seen on the line 7—7 of Fig. 6.

Fig. 8 is a view through one of the clutches, as seen on its horizontal center line.

Fig. 9 is a view of the gearing used in one of the clutches and as dissociated from the clutch drum.

Figure 1:
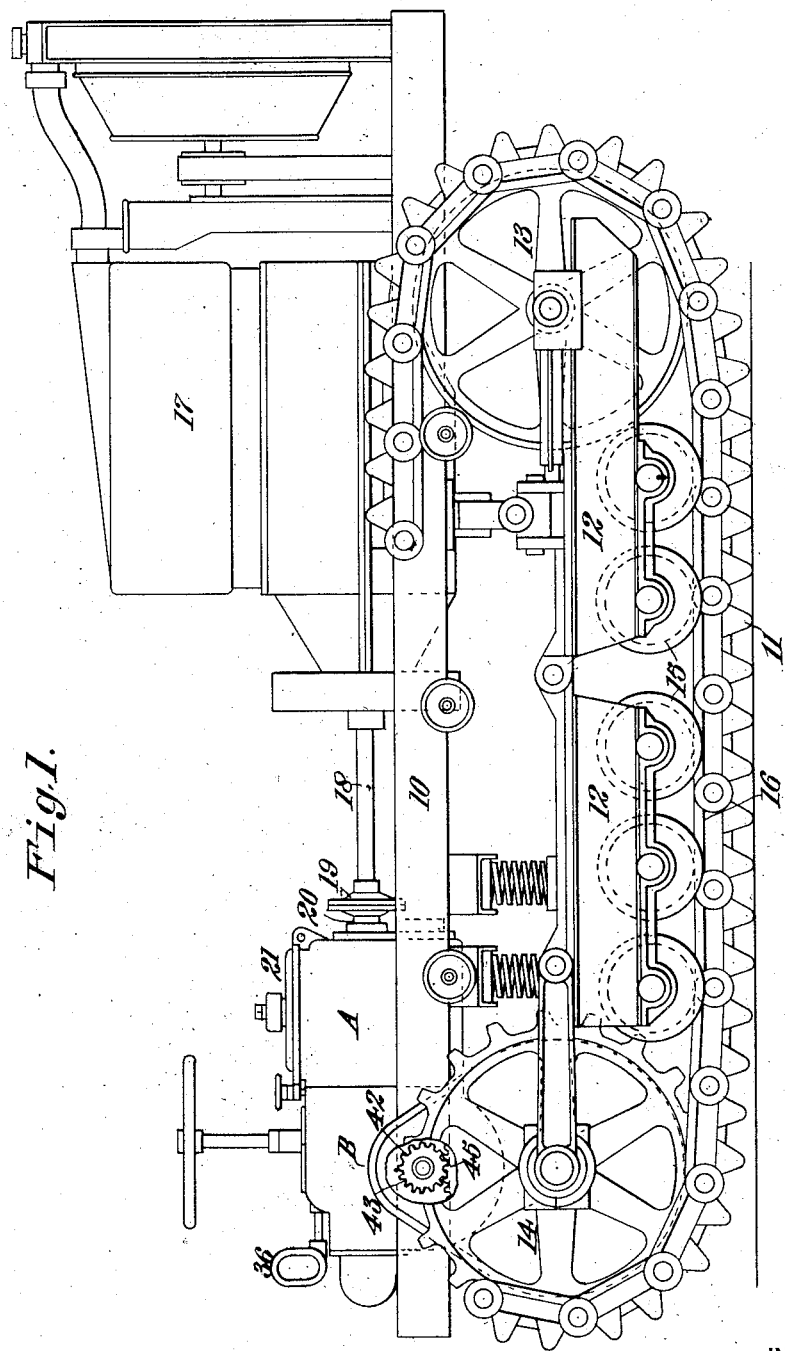
Figure 1 is a view in side elevation disclosing the complete tractor equipped with the transmission with which the present invention is concerned.

In the drawings, 10 indicates a main frame supported at its opposite sides by self-laying chain track units 11. These units are universally illustrated as having truck frames 12 at the forward ends of which idler wheels 13 are mounted and at the rear of which driving sprockets 14 are disposed. The truck frames carry a series of load supporting rollers 15 which rest upon the lower run of chain track 16. This track embraces the truck frame 12, the idler wheel 13 and the driving sprocket 14. Mounted upon the frame 10 is a power plant 17 having a crank shaft which drives a horizontally extending propeller shaft 18. A coupling 19 is provided at the rear end of the propeller shaft 18 and is secured thereby to a transmission driving shaft 20. This shaft is particularly shown in Fig. 2 as extending longitudinally of the tractor and as being housed within a transmission case 21. The transmission case is formed with front and rear bearings 22 and 23, through which the drive shaft 20 extends and an intermediate bearing 24 is further support thereof.

Disposed directly below the shaft 20 is a secondary drive shaft 25 carried in bearings 26 and 27 of the transmission housing. The secondary drive shaft is fitted with a reversing gear 28, a low speed gear 29 and a high speed gear 30. The gears 28 and 29 may be alternately engaged by a gear 31 splined upon the main drive shaft 20 while the gear 30 may be optionally engaged by a high speed driving gear 32 splined upon the shaft 20. The gears 31 and 32 are rigidly connected and may be shifted by a yoke member 33 fixed upon a shifting rod 34. This rod extends parallel to the drive shaft 20 and is slidably mounted through bearings 35 formed in the top of the transmission case. A handle 36 is secured to the rear end of the shaft 34 for the operation thereof.

The transmission case, as generally indicated in Fig. 4, has a speed changing gear compartment A, a clutch compartment B in longitudinal alinement therewith, and oppositely extending bearing housings C and D which stand in longitudinal alinement with each other and transversely of the main portion of the transmission case. Inclosed within the rectangular clutch compartment B are clutch units 37 and 38. These units are mounted upon a final drive shaft 39 which extends through the bearing portion C and D and across the clutch compartment B. The shaft 39 is driven by a large bevel gear 40 fixed upon it at its middle and in mesh with the bevel pinion 41. The pinion 41 is secured upon the rear end of the secondary drive shaft 25 and is driven through the gears comprising the speed changing gear set inclosed within the compartment A. The clutches 37 and 38 are constructed in duplicate and are intended to control the driving speeds of final drive pinions 42 and 43, shown in Fig. 4 as mounted around the ends of the final drive shaft 39 and intended to mesh with final drive gears 45, one of which is fixed in driving relation to each of the driving sprockets 14. The gears 42 and 43 are mounted upon the outer ends of driving sleeves 46 which telescope over the opposite ends of the final drive shaft 39.

Mounted upon the inner end of each sleeve 46 is a worm gear 47 which is keyed thereto and is in mesh with a pair of worm gears 48 and 49 disposed upon diametrically opposite sides of the longitudinal axis of the sleeve. These gears are mounted upon shafts 50 carried in parallel bearings of a gear frame 51. The gear frame is keyed upon the driving shaft 39 and is formed with a central opened portion to accommodate a worm wheel 47. This wheel stands directly between the worm gears 48 and 49 and is constantly in mesh with both of them. The worm wheel is keyed upon the sleeve 46, thus imparting motion from the driving shaft 39 to the sleeve when the gear frame 51 is permitted to move without obstruction and the worm gears 48 and 49 act to lock or form a couple in combination with the worm wheel 47. The shafts 50 of the worm gears 48 and 49 are fitted with pinions 54. These pinions are secured to the ends of the shaft and are in mesh with pinions of larger diameter, as indicated at 55. The pinions 55 are mounted upon freely rotating shafts 56 which are disposed in longitudinal alinement with each other and upon diametrically opposite sides of the driving shaft 39. The outer ends of the short shafts 56 are provided with bevel gears 57 which mesh with a bevel ring gear 58. The ring gear circumscribes the axis of the shaft 39 and is formed as a part of a head casting 60, freely rotatable around the hub of the gear frame 51. The casting 60 coöperates with a drum casting 61 to form a brake drum adapted to normally rotate without obstruction around the shaft and retard it, when desired, by the operation of a brake band 62. It will be understood, of course, that the preceding remarks relative to the gearing inclosed within the brake drum, is to be understood to apply to both of the sleeves 46 so that two clutch units 37 and 38 will be provided for individually controlling the action of the drive shaft 39.

In the operation of the present invention, the power plant imparts motion to the drive shaft 20, which motion is transmitted through one of the gears 31 and 32 to the gears 29 and 30. The shaft 25 will then be driven and will drive the shaft 39 through the gears 40 and 41. In the event that the brake bands 62 are not tightened upon the drums 61, the worm gears 48 and 49 will lock at the opposite sides of the worm wheel 47 and will cause the gear frames 51 of each of the clutches 37 and 38 to move as units with the sleeves 46 and thus to simultaneously drive the final drive pinions 42 and 43 at equal speeds. As the pinions 42 and 43 are in mesh with the large final drive gears 45, fixed in relation to the sprockets 14, the chain tracks 16 will move in unison. When it is desired to vary the speeds of travel of the two tracks 16 at the opposite sides of the vehicle, brake pressure is applied to one of the clutches 37 or 38 and this will retard its movement, which heretofore has been in unison with the gear frame 51. As the drum is retarded, the bevel ring gear 58 will, of course, be retarded and will make it necessary for the gears 57 to travel over the face thereof. The amount of travel will entirely depend upon the difference in rotating speeds of the drum and the frame, as established by the pressure of the brake band.

As the gears 57 travel over the face of the ring gear 58 they will produce rotation of the short shafts 56 and this rotation will be imparted through the gears 55 and 54 to the parallel worm shafts 50. Due to the arrangement, as shown in Figs. 6 and 7 of the drawing, the worm gears 48 and 49 will rotate in opposite directions and will act to produce a slippage between themselves and the worm wheel 47. This slippage will permit the drive shaft 39 to continue operation at a constant speed while it will cut down the speed of revolution of the sleeve 46 driven by the shaft. The result will be that the shaft 39 will be circumscribed by a sleeve moving at a lesser speed than the constant speed of the shaft 39. This decreased speed will be imparted to the final drive pinion at the end of the sleeve. If brake pressure had been applied to the clutch 38, the drive pinion 43 would move at a slower rate of speed than would the drive pinion 42 while the drive pinion 42 and the drive shaft 39 would be moving in unison. A release of the brake band would, of course, permit both final drive gears to be driven at the same speed while an increase on the pressure upon the brake band would act to further establish a difference in driving speeds between the gears 42 and 43.

It will thus be seen that the present invention does not only satisfactorily provide positive means for reducing the operating speeds of the chain tracks without dissipating an objectionable amount of power in the steering operation but also provides a very compact transmission mechanism, embodying a speed changing gear set for driving and positive gear sets for separately controlling the tracks, the latter being disposed in axial alinement with the final drive shaft.

Having thus described my invention, what I claim and desire to secure by Letters Patent is—

1. In a transmission mechanism, driving means, a drive shaft operated thereby, driving sleeves freely mounted upon the opposite ends of said shaft, final drive pinions secured on the ends of said sleeves, and positive reduction gearing establishing communication between the sleeves and the shaft on which they are mounted, said gearing comprising an outer drum, a brake on the drum, a ring gear secured within the drum, pinions meshing with said gear, two parallel worm spindles, operating pinions between the parallel worm spindles and the first mentioned pinions, and a central worm wheel meshing with worms on said worm spindles, the said central worm wheel being fixed to the driving sleeve, whereby a variation in speed may be imparted to either of the final drive pinions from the constantly driven shaft.

2. A transmission mechanism comprising driving means, a driven shaft operated thereby, freely rotatable driving sleeves mounted upon the opposite ends of said shaft, driving pinions fixed on the ends of said sleeves, gear frames keyed to the driven shaft and circumscribing the inner ends of said sleeves, gearing carried by said frames, brake drums inclosing the gearing and mounted to freely rotate around said shaft, and means connecting the brake drums and the gearing of said frames, whereby a retardation of the brake drums will produce a variation in the relative speeds of rotation of the driven shaft and a driving sleeve.

3. In a transmission mechanism, a transmission case formed with a central clutch compartment and oppositely disposed bearing portions emanating therefrom and in longitudinal alinement with each other, sleeves rotatably supported, one in each of said bearing portions, a shaft extending completely through both sleeves, means for driving the shaft, brake drums mounted to freely rotate upon the inner ends of said sleeves, gear frames keyed to the driving shaft and circumscribing the inner ends of the sleeves, drum heads coöperating with the brake drums to inclose the gear frames and freely rotated upon the hubs of said frames, a gear fixed to each drum head, gearing carried by the gear frame and operatively connected with the gears on the drum-heads, whereby a retardation of the brake drums will produce a variation in the relative speeds of rotation of the sleeves and shaft.

In testimony whereof I have hereunto set my hand in the presence of two subscribing witnesses.

ELMER E. WICKERSHAM.

Witnesses:
R. E. MANN,
P. EHRENFELD.